Sept. 3, 1935.  V. C. NORQUIST  2,013,634
FILTER
Filed Feb. 7, 1934
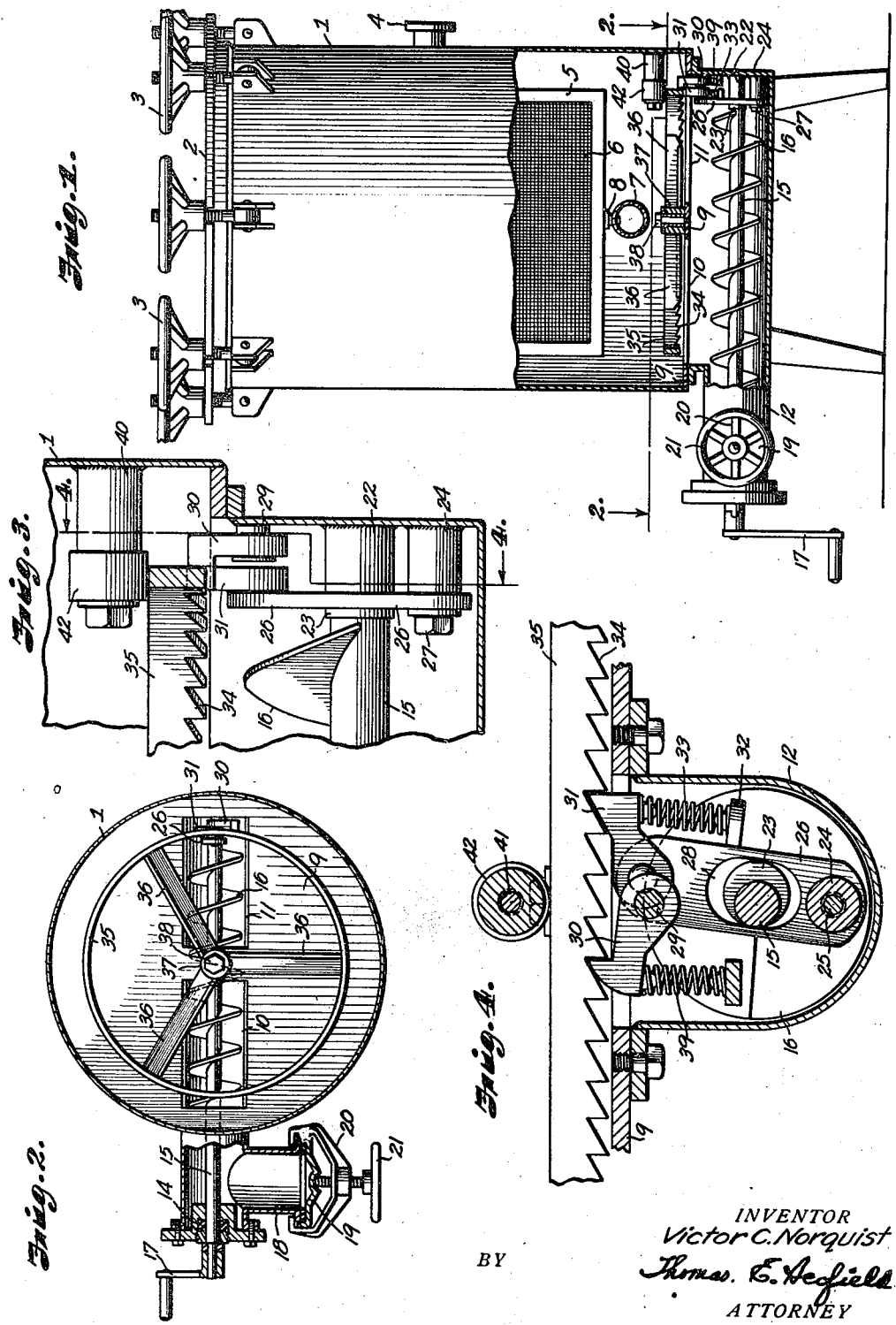
INVENTOR
Victor C. Norquist
BY Thomas E. Hedfield
ATTORNEY Patented Sept. 3, 1935

2,013,634

UNITED STATES PATENT OFFICE 2,013,634

FILTER

Victor C. Norquist, Kansas City, Mo., assignor to Butler Manufacturing Company, Kansas City, Mo., a corporation of Missouri Application February 7, 1934, Serial No. 710,089

2 Claims. (Cl. 210—182)

My invention relates to filters and more particularly to a filter having incorporated therein means for cleaning the same of sludge and matter filtered out.

In multileaved filters in which a plurality of hollow filtering elements are housed within a casing into which the liquid to be filtered is introduced, the problem of cleaning the filters is acute. At present the method is to remove the filter cover; then the filter screens are removed and separately cleaned. The bottom of the filter is then flushed out or a pan is provided in which sludge may collect. These methods are time consuming and tedious. In the dry cleaning industry and in other industries, the matter filtered out is often offensive, rendering the task of cleaning filters an unpleasant one.

One object of my invention is to provide a filter in which means for cleaning it of sludge and matter filtered out is incorporated in the filter structure, per se.

Another object of my invention is to provide a novel and efficient means of cleaning filters.

Other and further objects of my invention will appear from the following description.

In the accompanying drawing which forms part of the instant specification and is to be read in conjunction therewith and in which like reference numerals are used to indicate like parts in the various views;

Figure 1 is an elevational view partly in section, showing a filter equipped with one form of carrying out my invention.

Figure 2 is a sectional view taken on a line 2—2 of Figure 1.

Figure 3 is an enlarged detail view of the elevation shown in Figure 1.

Figure 4 is a sectional view taken on a line 4—4 of Figure 3.

In general, my invention contemplates the provision of a trough communicating with the filter bottom. A conveyor means such as conveying screw is housed in the trough. Means are provided for operating the conveyor screw and means are also provided for directing the sludge into the trough.

More particularly referring now to the drawing, a filter casing 1 is provided with a cover member 2 which is secured thereto in pressure tight relation by means of securing screws 3. Liquid to be filtered enters the filter casing 1 through inlet pipe 4 and passes to the interior of the casing in which are positioned hollow filtering leaves 5, across which are stretched filtering screens 6. The interior of the filtering leaves communicate with a manifold 7 through nipples 8, the filtrate passing out of the filter through the manifold 7. A filter bottom 9 is provided with openings 10 and 11, allowing communication with a trough 12 which extends to one side of the filter, as can readily be seen by reference to Figures 1 and 2. Through a suitable stuffing box 14 is positioned an operating shaft 15, carrying a conveyor screw 16. The outer edge of the operating shaft 15 carries a crank 17. A branch duct 18 communicates with the trough 12 and has its outer end closed by cover plate 19 secured thereto in any suitable manner such as shown in Figure 2, namely a strong back 20 adapted to hold the cover 19 against its seat by the action of screw wheel 21. The opposite end of the shaft 15 which carries the screw conveyor 16 is mounted to rotate in a suitable bearing 22, as can readily be seen by reference to Figure 3. Near the bearing 22, the shaft carries an eccentric 23 which may be formed integral with the shaft 15 or may be connected thereto. Below the bearing 22 is provided another bearing 24 for the shaft 25 which carries link 26. The link 26 may be secured to the shaft 25 or may be loosely mounted thereon, being held in position by means of nut 27. A slot 28 is formed in the intermediate portion of link 26 and is adapted to be positioned upon eccentric 23. Above bearing 22 is a third bearing 29 about which pawl 30 is adapted to rotate. The upper end of link 26 carries pivotally secured thereto pawl 31. The link 26 also carries thrust lug 32, against which spring 33 is adapted to seat. The upper end of spring 33 contacts pawl 31 and urges it against the toothed periphery 34 of wheel 35 which is provided with arms 36. The arms 36 meet at hub 37 of the wheel 35. A stud bolt 38 is adapted to form the pivot for wheel 35, the stud bolt being screwed into the bottom 9 of the filter casing. The arms 36 of the wheel 35 are spaced closely adjacent the bottom of the filter and are adapted to act as wiper blades to scrape or move the sludge along the bottom of the filter into the trough 12. Pawl 30 is urged into contact with the toothed periphery 34 of the wheel 35 by means of spring 39, as can readily be seen by reference to Figure 4.

Within the filter casing, I provide a fourth bearing 40 for the shaft 41 of wheel 42 which is adapted to press against the upper periphery of the wheel 35, in the region of the pawls 30 and 31. As will be more fully explained hereinafter, the wheel 42 takes the thrust of the driving action of pawl 31 and prevents it from being transmitted to the pivot stud 38.

In operation, the liquid to be filtered enters the filter through inlet pipe 4 and passes into the filter casing through the screen 6 of the hollow filter leaves 5. The filtrate passes into the interior of the filtering members 5, through nipples 8 into manifold 7, and is withdrawn from the filter. The sludge and sediment is left within the filter casing. This may be scraped from the exterior surfaces of the filter screen 6 or may drop to the bottom of the filter if of such a nature as not to adhere to the filter screens. Usually the sludge is very finely divided, viscous material. I have found that, in an arrangement similar to that described above, it is practically impossible to continuously rotate wiping arms 36 through heavy viscous sludge. It appears that, in response to motion, the inertia of the sludge causes it to act as if it were a solid. If, however, a slight motion is given to the wiping arms and an interval of time allowed to permit flow to take place, the wiping arms may be rotated without difficulty. In other words, an intermittent motion of slight angularity of the wiping arms is possible, if a period of "rest" is allowed to permit the sludge to flow while a continuous movement which allows no period of flow for the sludge is practically impossible. If it were attempted to continuously rotate wiping arms, a mechanical advantage would be necessary. The stresses involved would be so large as to make the equipment cumbersome and impractical.

When it is desired to clean the filter of sludge, the crank 17 is rotated. This rotates shaft 15 and actuates conveyor screw 16 to move such sludge as is in the trough toward the removal duct 18. The cover 19 of the removal duct 18 is removed and the receptacle placed thereunder. Rotation of the shaft 15 also actuates cam 23.

Referring now to Figure 4, it will be observed that movement of the link 26 around its pivot so that the upper portion of the link travels to the left will move pawl 31 into engagement with the adjacent path to the left. During this movement, pawl 30 holds the wheel 35 against movement. As the shaft continues to rotate, the cam 23 will move the upper end of the link to the right, causing pawl 31 to drive the wheel through the amplitude of one tooth. This slight motion is easily performed. During the return of the pawl 31, a period of rest is permitted, allowing the sludge to yield against the deformation produced by the rotation of the wiper arms 36 which are carried by the wheel 35. It will be seen that pawl 31 is the driving pawl and pawl 30 is a retaining pawl. The arms 36 will move the sludge into the trough 12 from which it is removed by the conveyor 16 and passed into the receptacle placed under the opening of branch duct 18.

It will be seen that I have accomplished the objects of my invention. I have provided a filter construction having incorporated therewith means for removing sludge from the bottom thereof in a simple and expeditious manner. The filter need not be disassembled in order to clean it. The tedious and unpleasant task of cleaning filters of the type described is rendered expedient and easy. The time required is considerably reduced.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A filter comprising in combination a casing, a hollow filtering member within said casing, means for introducing the liquid to be filtered into said casing, means for withdrawing filtrate from the interior of said filter member, said casing having a bottom provided with an opening, a duct communicating with said opening, a conveyor screw within said duct, wiping means for said filter bottom adapted to transfer sludge into said duct, means for continuously rotating said conveyor screw and means for intermittently operating said wiping means.

2. A filter comprising in combination a casing, a hollow filtering member within said casing, means for introducing the liquid to be filtered into said casing, means for withdrawing filtrate from the interior of said filter member, said casing having a bottom provided with an opening, a duct communicating with said opening, a conveyor screw within said duct, wiping means for said filter bottom adapted to transfer sludge into said duct, means for rotating said conveyor screw and means operated by the rotation of said screw for intermittently operating said wiping means.

VICTOR C. NORQUIST.